(12) United States Patent
Frisch (10) Patent No.: US 7,322,376 B2
(45) Date of Patent: Jan. 29, 2008

(54) PIEZOELECTRIC VALVE

(75) Inventor: Herbert Frisch, Göppingen-Bartenbach (DE)

(73) Assignee: Festo AG & Co., Esslingen (DE)

( * ) Notice: Subject to any disclaimer, the term of this patent is extended or adjusted under 35 U.S.C. 154(b) by 307 days.

(21) Appl. No.: 11/052,524

(22) Filed: Feb. 7, 2005

(65) Prior Publication Data

US 2005/0199301 A1 Sep. 15, 2005

(30) Foreign Application Priority Data

Feb. 11, 2004 (EP) .................... 04002968

(51) Int. Cl.
*F15B 13/044* (2006.01)

(52) U.S. Cl. .................... 137/625.65; 137/625.5; 251/129.06

(58) Field of Classification Search ........... 137/625.65, 137/625.2; 251/129.06; 310/332, 330; 417/410, 417/413, 322
See application file for complete search history.

(56) References Cited

U.S. PATENT DOCUMENTS

| | | | | | |
|---|---|---|---|---|---|
| 4,450,375 A | * | 5/1984 | Siegal | .................... | 310/331 |
| 4,474,212 A | * | 10/1984 | Schmitz | ................. | 137/614.11 |
| 4,492,360 A | * | 1/1985 | Lee et al. | .............. | 251/129.06 |
| 4,629,926 A | * | 12/1986 | Siegal | .................... | 251/129.01 |
| 5,219,278 A | * | 6/1993 | van Lintel | ............... | 417/413.1 |
| 5,343,894 A | * | 9/1994 | Frisch et al. | ........... | 137/625.65 |
| 5,669,416 A | * | 9/1997 | Nusche | .................. | 137/625.44 |
| 6,142,444 A | * | 11/2000 | Kluge | .................... | 251/129.06 |
| 6,484,754 B1 | * | 11/2002 | Muth et al. | ............ | 137/625.66 |
| 6,499,509 B2 | * | 12/2002 | Berger et al. | .......... | 137/625.65 |
| 2002/0059957 A1 | * | 5/2002 | Frisch et al. | ............ | 137/596.2 |
| 2004/0177890 A1 | * | 9/2004 | Weinmann et al. | .... | 137/625.65 |

FOREIGN PATENT DOCUMENTS

| EP | 0 538 236 A1 | 4/1993 |
|---|---|---|
| EP | 0 993 567 B1 | 4/2000 |
| EP | 1 207 329 A1 | 5/2002 |

* cited by examiner

*Primary Examiner*—Eric Keasel
*Assistant Examiner*—Craig Price
(74) *Attorney, Agent, or Firm*—Hoffman & Baron, LLP (57) ABSTRACT

A piezoelectric valve has a flexural transducer accommodated in a valve housing and having a free ending cantilever operational section able to be deflected by electrical control. The operational section extends over two controlled valve openings lying on the same side and possesses two control section associated with such valve openings. One of the control section serves for control of a supply opening and is urged into its closed by actuating means provided in addition to the flexural transducer. The actuating force is powerful enough to reach the closed position, when the other control section clears the associated valve opening.

20 Claims, 6 Drawing Sheets

PIEZOELECTRIC VALVE

BACKGROUND OF THE INVENTION

The invention relates to a piezoelectric valve comprising a flexural transducer arranged in a valve housing and having at one end a supporting section mounted by bearing means in the housing and furthermore possessing a free ending operational section, which extends in a valve chamber past two controlled valve openings in the form of a supply opening and an exit flow opening and is able to be deflected by suitable electrical control in a deflection plane athwart its longitudinal direction in order to clear each of the two controlled valve openings selectively for connection with an operational opening or by engagement with an associated valve seat to close same.

THE PRIOR ART

In the case of a 3/2 way piezoelectric valve disclosed in the European patent publication 0 538 236 B1 of this type the flexural transducer has its deflectable operational section extending between two controlled valve openings, in the case of which it is a question of a supply opening and a exit flow opening. If no voltage is applied the operational section assumes a turned off position on the valve seat surrounding the supply opening so that the supply opening is closed. By the application of a voltage to the flexural transducer the operational section will be subjected to a deflecting force owing to the piezoelectric effect so that it is pivoted, the supply opening being cleared by it and the exit flow opening being finally closed by it.

The European patent publication 1 207 329 B1 describes a piezoelectric valve whose structure principally allows both a 3/2 functionality and also for example a 3/3 functionality. This piezoelectric valve is provided with two adjacently placed flexural transducers which are collected together at a rear supporting section to form a flexural transducer unit. Each flexural transducer extends past a controlled valve opening. By suitable matched control of the two flexural transducers the controlled valve openings may be cleared and closed alternatively or also simultaneously. However, the production of the flexural transducer unit is relatively expensive. Furthermore, there is a substantial load on the supporting section owing to the twisting forces occurring here. Last but not least, there a relatively large number of electrical contacts to be made in order to render possible the electrical control of the two flexural transducers.

In the European patent publication 0 993 567 B1 different types of piezoelectric flexural transducers are described. In addition to those which extend in a cantilever manner with free ends, designs are contemplated which are fixed at either end so that on activation they are not pivoted and only bulge out.

SHORT SUMMARY OF THE INVENTION

One object of the invention is to provide a piezoelectric valve which in a comparatively simple and inexpensive fashion renders possible a three way functionality with few relaxation problems.

In order to achieve these and/or other objects appearing from the present specification, claims and drawings, in the present invention the two controlled valve openings are arranged on the same longitudinal side of the operational section spaced apart in the longitudinal direction thereof, the operational section having two suitably spaced apart control sections on the supply side and the exit flow side, which are associated with the two controlled valve openings, and at the supply side control section actuating means provided in addition to the flexural transducer engage the operational section, such actuating means serving to continuously actuate the supply side control section in its closing direction, the actuating force being large enough to hold the supply side control section in the closed position when the exit flow control section is in the cleared position.

It is in this manner that a piezoelectric three way valve with comparative freedom from relaxation may be produced using relatively simple means. The actuating means acting on the operational section, as for example spring means or permanent magnet means, ensure a reliable closing of the supply opening against the acting fluid pressure without subjecting the flexural transducer to danger of relaxation. Owing to the deflecting force superimposed on the actuating force, and produced by the electrical control of the flexural transducer it is possible to ensure that either the control section on the supply side or on the exit flow side closes the respectively associated controlled valve opening, while simultaneously the respectively other controlled valve opening is cleared so that the fluid to be controlled may be transferred between it and a power opening able to be connected with a load. In addition to a 3/2 valve functionality on the basis of the principle in accordance with the invention it is possible to relatively simply produce a 3/3 valve functionality as well without having to have recourse to a multiple arrangement of flexural transducers. Since hence on the basis of the basic principle a large spectrum of variations is possible, by the extensive use of identical parts, to maintain a low level of production costs.

Further advantageous developments of the invention are defined in the claims.

The controlled valve openings may in accordance with needs be placed differently in their sequence so that either the supply flow opening or the exit flow opening is nearer the supporting section. Accordingly there is furthermore a different placement of the control section constantly under the influence of the actuating means.

In order to produce a 3/3 valve the flexural transducer is preferably so designed and arranged that in its neutral condition free of electrical voltage both control sections assume the closed position with reference to the respectively associated controlled valve opening. In connection with one design of the flexural transducer, which, given suitable electrical control, starting in the neutral position renders possible the production of a deflecting force in selectively one or the other direction, it is starting in the neutral condition possible to set a supply condition or a venting condition, either the supply opening or the exit flow opening being connected with the operational opening while simultaneously the respectively other valve opening is closed. The neutral condition corresponds in this case to a shut-off position, in which both controlled valve openings are sealingly closed by the flexural transducer.

In order to produce a 3/2 valve functionality the flexural transducer is preferably so designed and arranged that in the electrically voltage-free neutral state the one control section assumes the closed position and the other section assumes the cleared or released condition with reference to the respectively associated controlled valve opening. This may be more particularly achieved by employing a flexural transducer which in the neutral condition has an at least essentially linear extent and is so placed that its longitudinal axis has a slant with reference to a valve seat plane containing the two controlled valve openings in the neutral condition. If the flexural transducer is then electrically excited starting in the neutral condition, firstly the second control section moves into the closed position as well, the supporting action in connection therewith during further performance of the switching operation meaning that the control section initially still in the closed position is lifted clear of the associated valve seat and is deflected into the released position.

In accordance with the slant selected in the neutral condition 3/2 piezoelectric valves may be produce in a "normally shut" or "normally open" form.

If the support position for the supporting section of the flexural transducer is able to be adjusted in the deflection plane perpendicularly to the longitudinal direction of the flexural transducer, the slant angle present in the neutral condition of the flexural transducer may be simply varied in order to have the desired valve type. Furthermore, the adjustability of the supporting section in connection with a 3/3 way valve renders possible an exact alignment of the flexural transducer so that in the neutral condition it assumes a shut position closing both controlled valve openings.

The operational opening able to be selectively connected with or shut off from the controlled valve openings preferably opens on the same longitudinal side as the controlled valve openings into the valve chamber containing the operational section of the flexural transducer. Preferably, the exit flow opening lies in the longitudinal direction of the flexural transducer between the two controlled valve openings.

In principle it would be possible for the flexural transducer to be secured in its supporting section immovably in relation to the valve housing, for example by being firmal gripped. However, for the desired flexure properties of the flexural transducer it is an advantage, if the flexural transducer is supported on the corresponding support position so as to be bodily deflectable in relation to the valve housing. Accordingly it may then move into the optimum position without compulsion.

In order to produce the pivotal bearing means it would be certainly possible to provide a stationary virtual or physical axle, which defines an axis of rotation for the flexural transducer. For this purpose projecting trunnions on the two longitudinal side edges of the flexural transducer could be supported on the valve housing.

More particularly when the piezoelectric valve only has small dimensions, the support for it may be provided if the supporting section is thrust by spring means (bearing against the valve housing) resiliently against a counter abutment on the valve housing.

If recourse is had to a counter abutment, which defines a counter abutment section resting linearly on the supporting section, the result is a reliable support for the flexural element so that twisting of the flexural transducer is opposed and a reliable sealing engagement of the control sections on the valve seats of the controlled valve openings is ensured.

A comparable effect may however also be obtained in the case of a counter abutment only making punctuate engagement with the flexural transducer, if the valve seats provided in connection with the operational section have suitable transverse dimensions. In this context it is for example possible to provide one or both controlled valve openings with an opening cross section, which has an elongated configuration perpendicular to the plane of deflection. Alternatively the respective controlled valve opening could be made not only in the form of a single opening but in the form of a plurality of individual valve openings, arranged athwart the deflection plane alongside each other and each having its own valve seat against which the operational section may bear. In all cases it is possible in this manner to achieve a reliable multiple supporting action for the flexural transducer in its longitudinal and transverse direction, which in every switching position oppose a skewing movement about the longitudinal axis.

Further advantageous developments and convenient forms of the invention will be understood from the following detailed descriptive disclosure of embodiments thereof in conjunction with the accompanying drawings.

DETAILED ACCOUNT OF WORKING EMBODIMENTS OF THE INVENTION

The piezoelectric valves illustrated in the drawings respectively possess a normally two-part valve housing 1 which in the interior delimits an elongated valve chamber 2. In this valve chamber 2 there is a strip-like flexural transducer 3 having an elongated form, whose rear end section forms a supporting section 4 by which it is supported directly or by way of intermediately placed support means on the valve housing 1. The position of support is referenced 5.

Starting at the support position 5 the flexural transducer 3 projects toward the opposite end. At the supporting section 4 it is adjoined by a cantilever-like operational section 6 which extends over two controlled valve openings in the form of a supply opening 7 and an exit flow opening 8.

The above mentioned controlled valve openings are the openings, facing the valve chamber 2, of two valve ducts in the form of a supply duct 12 and an exit flow duct 13. The supply duct 12 is in operation of the piezoelectric valve, connected with a pressure source P supplying the fluid whose flow is to be controlled. Depending on whether the piezoelectric valve is operated with a hydraulic medium or with compressed air, the exit flow duct 13 leads to a tank or to the atmosphere R. Additionally a further valve duct, functioning as a operational duct 14, opens at a operational opening 9 also into the valve chamber 2. It is normally connected with a load to be driven, as for example a drive operated by fluid power.

Figure 14:
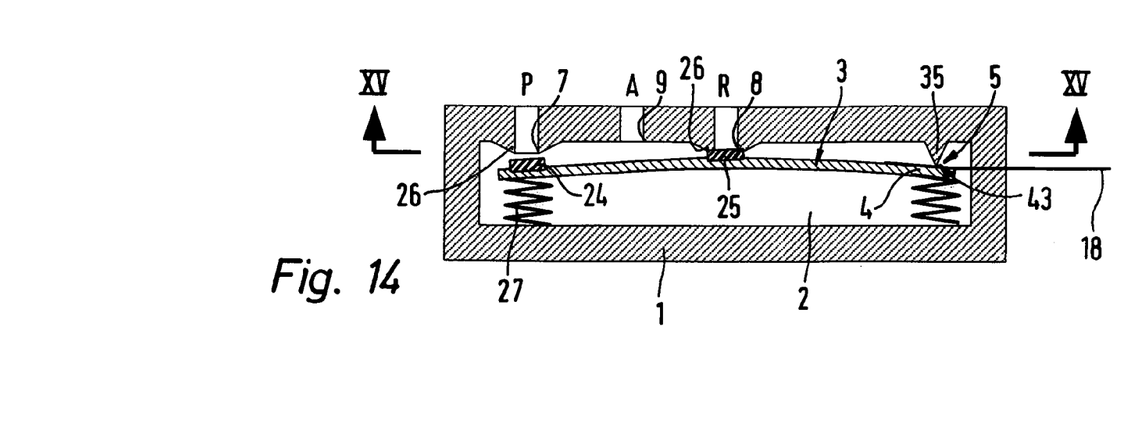
FIG. 14 shows the piezoelectric valve as in FIG. 11 but in a supply position.

The flexural transducers 3 preferably (see enlarged portion in FIG. 1) form a trimorphic structure with two elongated piezoelectric bodies 16a and 16b attached alongside each other with the interposition of an inner electrode 15. Each piezoelectric body 16a and 16b is provided with an outer electrode 17a and 17b on the outer side opposite to the inner electrode 15. Using electrical contact means 18 extending out of the valve housing 1 and only diagrammatically indicated it is possible for a control voltage to be applied to the electrodes 15, 17a and 17b i a selected manner, which on the basis of the reversed piezoelectric effect in the operational section 6 causes a deflecting force $F_A$, which strives to deflect the operational section 6 in a deflection plane 22 in relation to the supporting section 4 supported on the valve housing 1. At least one in the case of 3/3 way piezoelectric valves the control voltage may be selectively so applied that the deflecting force $F_A$ is selectively one of two mutually opposite directions. In this case for example a control voltage is applied between the inner electrode 15 and the outer electrode 17b or between the inner electrode 15 and the outer electrode 17b. The deflection plane 22 extends in FIGS. 1 through 11 and in FIGS. 14, 17 and 19 in parallelism to the plane of the drawing and is at a right angle to the plane of extent of the flexural transducer 3 which as mentioned is strip-like.

In principle the flexural transducer 3 could have a different structure, as for example in the form of a bimorphic piezoelectric element. It is possible furthermore to have a multi-layer design of the piezoelectric bodies 16a and 16b in order to produce a multi-layer flexural element.

In all embodiments of the invention the flexural transducer 3 extends both over the supply opening 7 and also over the exit flow opening 8, such two valve openings being arranged on and the same longitudinal side of the operational section 6, which the operational section 6 moves closer to and further away from. In other words it is a question of such a longitudinal side of the flexural transducer 3, which is associated with one of the two major, i.e. outer surfaces of the flexural transducer. In this case the two controlled valve openings 7 and 8 are arranged with a distance apart in the longitudinal direction of the operational section 6 so that either—as in the case of the designs in accordance with FIGS. 1 through 3 and 7 through 10—the supply opening 7 lies between the supporting section 4 and the exit flow opening 8, or—as in the designs of FIGS. 4 through 6 and 11 through 20—the exit flow opening 8 is placed between the supporting section 4 and the supply opening 7. The possible deflection movement of the operational section 6 is indicated in the drawing generally by the double arrow 23. In the direction of this deflection movement 23 opposite a respective controlled valve opening 7 and 8 the operational section 6 of the flexural transducer 3 possesses respectively one control section, which—in accordance with the association with the corresponding valve opening 7 and 8—will be termed a control section on the supply side or, respectively, as exit flow control section 25. These control sections 24 and 25 may be directly constituted by one of the flexural transducer layers or however—as is the case with the embodiments—by a respective pad consisting of a suitable sealing material secured to the flexural transducer 3. For instance, the pads may be rubber pads.

The two controlled valve openings 7 and 8 are respectively surrounded by a valve seat 26 standing proud of adjacent valve housing faces. However, the proud valve seat design is not mandatory.

Each control section 24 and 25 is able to shut off the valve duct opposite to it in a fluid-tight manner, when it is thrust with a certain force against the associated valve seat 26.

Accordingly it is possible to control the fluid flow through the supply duct 12 and the exit flow duct 13 by moving the respective associated control section 24 and 25 either to engage the respective valve seat 26 or moving it clear thereof so that the respective supply opening 7 or exit flow opening 8 is either cleared or sealed. The respective position of the control sections 24 and 25 is produced by activation and inactivation and the resulting deflection and non-deflection of the flexural transducer 3.

The operational opening 9 is open independently of the current position of the operational section 6 so that a continuous connection is present between the operational duct 14 and the valve chamber 2. Preferably, the operational opening 9 is located on the same longitudinal side of the flexural transducer 3 as the two controlled valve openings 7 and 8. For the sake of having shorter flow paths it is preferably placed between the two controlled valve openings 7 and 8.

Each piezoelectric valve possesses actuating means 27 in addition to the flexural transducer 3, which act at the supply side control section 24 on the operational section 6 and by means of which the control side control section 24 is constantly urged toward its closed position. Preferably with the actuating means it is a question of a spring means taking effect between the operational section 6 and the valve housing in the form of a mechanical compression spring with its end bearing against the inner face of the valve chamber 2 and at the other end to the rear on the operational section 6.

Alternatively other actuating means could be provided, for instance actuating means with a fluidic or magnetic principle of operation. In any case the actuating force should be so large that the fluid pressure obtaining in the supply duct is not able to lift the supply side control section 24 located in the closed position. More particularly, the actuating force should be at least so large that the supply side control section 24 may be held in the closed position, when the exit flow control section is located in the released position lifted from the associated valve seat.

Figure 1:
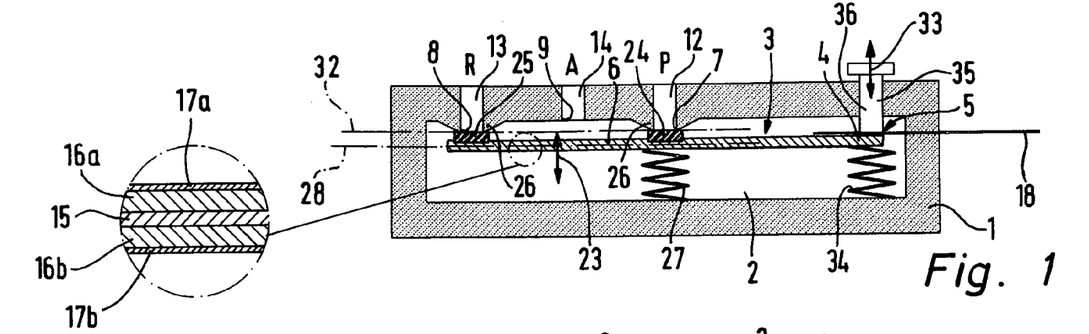
FIGS. 1 through 3 show a first design of the piezoelectric valve in accordance with the invention in the form of a 3/3 way valve in a diagrammatic longitudinal section, FIG. 1 showing a shut position, FIG. 2 a supply position and FIG. 3 a venting position.
Figure 2:
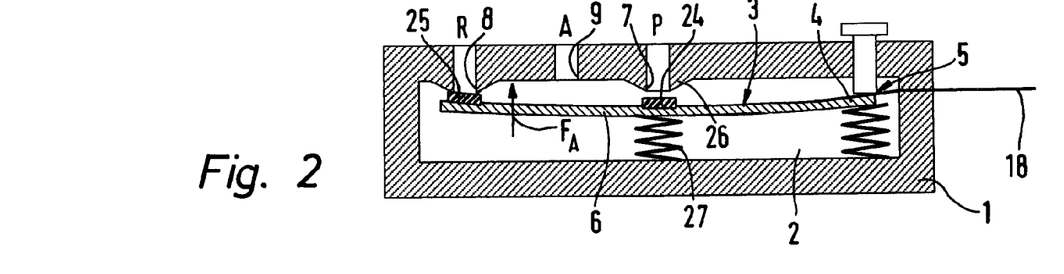
Figure 3:
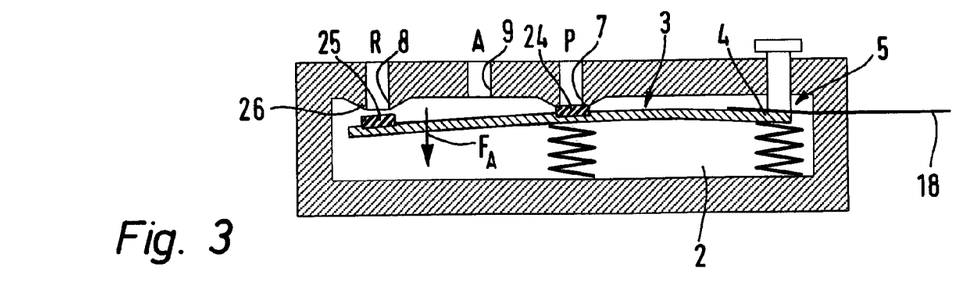

The piezoelectric valve illustrated in FIGS. 1 through 3 is a designed in the form of a 3/3 way valve, and therefore possesses three switching positions for linking the three valve openings 7, 8 and 9. Its flexural transducer 3 in the electrically voltage-free neutral state has an essentially linear extent and is so arranged in the valve chamber 2 that both control sections 24 and 25 rest against the opposite valve seat 26 and assume the closed position. The longitudinal axis 28 of the flexural transducer 3 extends in this case at some distance from, and parallel to, a valve seat plane 32 containing the two valve seats 26. In this valve seat plane 32 there is also the support position 5 so that the flexural transducer 3 is supported in its longitudinal direction at three positions on the housing. Owing to the actuating means 27, which in the longitudinal direction of the flexural transducer 3 act at the same level as the supply opening 7 on the flexural transducer 3, the supply opening 7 is closed by the supply side control section 24 with a sufficient thrust force in order to prevent lifting by the fluid pressure obtaining.

Thus there is a shut position, in which the flexural transducer 3 seals off the two controlled valve openings 7 and 8. In order to move into this shut position by suitable exact alignment of the two control section 24 and 25, in the working embodiment the support position 5 is able to be adjusted in the deflection plane 22 as indicated by the double arrow transverse the longitudinal direction of the flexural transducer 3. Accordingly the alignment of the flexural transducer 3 in relation to the valve seat plane 32 is exactly possible in order to ensure producing the closed position of the two control sections 24 and 25 in the shut position.

In order to move the piezoelectric valve of FIGS. 1 through 3 into the shut position in which the supply opening 7 is connected by way of the valve chamber 2 with the operational opening 9 and simultaneously the exit flow 8 remains closed the flexural transducer 3 is so operated that a deflection force $F_A$ is produced in the direction of the longitudinal side having the valve seats 26. This causes a deflection of the operational section 6 with a bulging out of the middle part, the control section 24 on the supply side being lifted from the supply opening 7 overcoming the pressing force of the actuating means 27 (FIG. 2).

If on the other hand the venting position is to be set, in which the exit flow opening 8 is connected by way of the valve chamber 2 with the operational opening 9 and simultaneously the supply opening 7 is closed, the control of the flexural transducer 3 is in the opposite direction so that a deflecting $F_A$ directed away from the side of the valve seats 26 is produced. In accordance with FIG. 3 this means that the exit flow control section 25 associated with the free end of the operational section 6 is pivoted and lifted away from the exit flow opening 8, while the control section 24 on the supply side is thrust by the actuating means 27 toward the supply opening 7.

Figure 4:
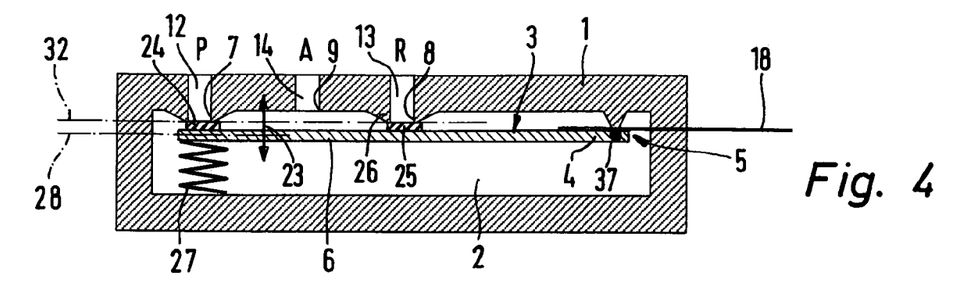
FIGS. 4 through 6 again show a 3/3 way piezoelectric valve in a longitudinal section whose supply and exit flow openings are changed over in relation to the arrangement in FIGS. 1 through 3, FIG. 4 showing a shut position, FIG. 5 a supply position and FIG. 6 a venting position.
Figure 5:
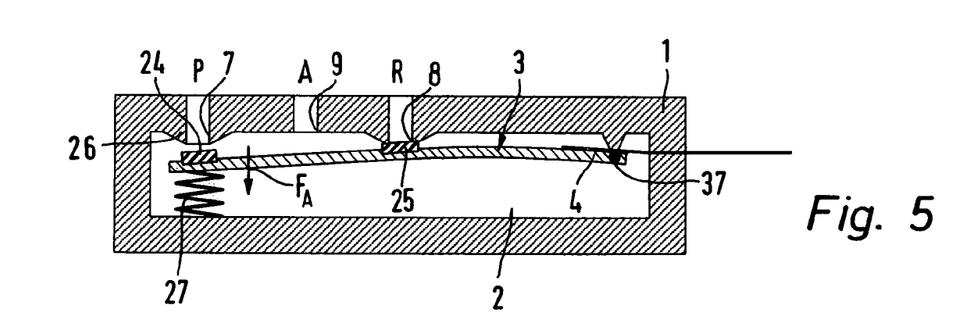
Figure 6:
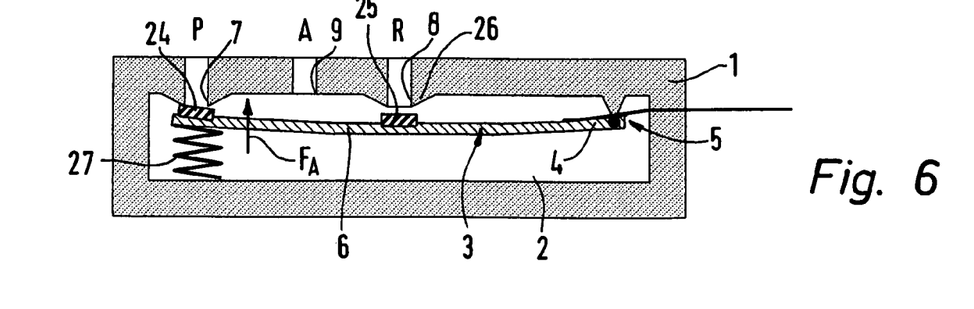

Apart from the changed over arrangement of the two controlled valve openings 7 and 8 and a different manner of supporting the supporting section 4 the structure of the piezoelectric valve in accordance with FIGS. 4 through 6 is the same as that of the above described one. In order to move into the supply position in this case in the operational section 6 a deflecting force $F_A$ directed away from the side of the valve seats 26 is produced, which means that the operational section 6 is pivoted away at the free end provided with the supply flow control section 24 and there is a displacement of the actuating means 27 away from the supply opening 7, whereas simultaneously the exit flow control section 25 remains in engagement with the valve seat 26 of the exit flow opening 8 owing to bulging of the flexural transducer 3. In order to get into the venting position there is a reversed control of the flexural transducer 3, the supply flow side control section 24 in addition to the actuating means 27 furthermore being thrust with the resulting deflecting force $F_A$ against the supply flow opening 7, while the operational section 6 simultaneously so bulges out that the exit flow control section 25 in the middle part is cleared from the exit flow opening 8.

The piezoelectric valves depicted in FIGS. 7 through 10 have a 3/2 functionality and may if needed be operated with a flexural transducer, whose operational section 6 may exert a deflecting force $F_A$ in only one direction. As regards the basic structure the piezoelectric valves of FIGS. 7 through 10 differ from those of FIGS. 1 through 3 only as regards the fact that the support position 5 is differently positioned and in the electrically voltage-free neutral state the flexural tranducer 3 is slanted in relation to the valve seat plane 32. This means that in the neutral state the one control section assumes the closed position and the other control section assumes the released condition.

Figure 7:
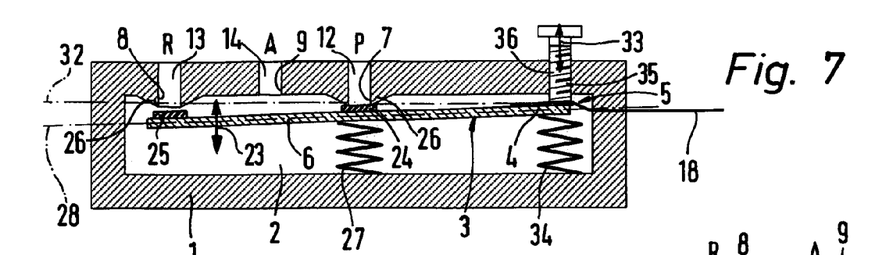
FIGS. 7 and 8 show the piezoelectric valve in a 3/2 way design as a normally closed design, FIG. 7 showing a venting position and FIG. 8 a supply position.
Figure 8:
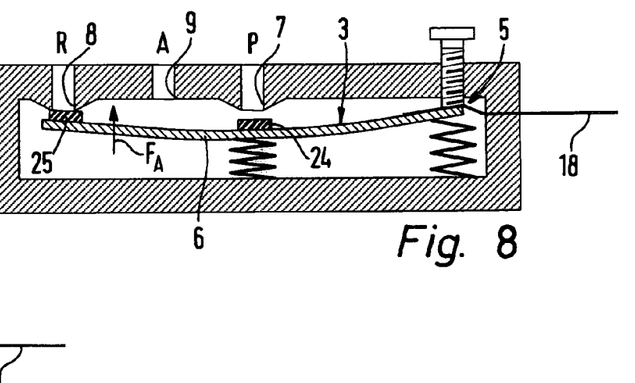

In the case of the arrangement of FIGS. 7 and 8 the slant of the flexural transducer 3 is so selected in the neutral condition that the supply flow side control section closes the supply opening 7, while the exit flow control section 25 is lifted from the exit flow opening 8 and clears it. It is hence a question of a valve of the type "normally closed", the venting position being produced in the electrically voltage-free neutral state. For switching over into supply state position the flexural transducer 3 is so excited that the operational section experiences a deflection force $F_A$ toward the valve seats 26 so that it bulges out in the middle part and finally the condition depicted in FIG. 8 is produced, which is comparable with the condition described with reference to FIG. 2.

Figure 9:
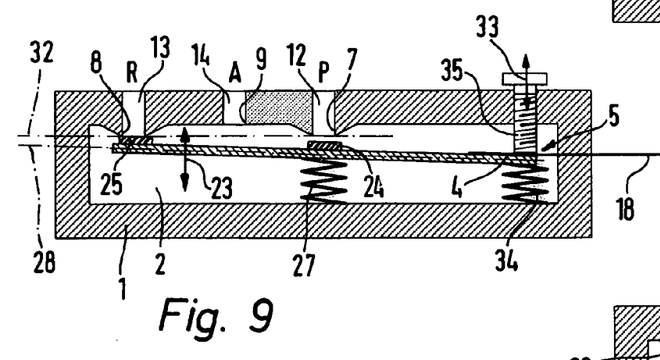
FIGS. 9 and 10 again show a 3/2 way piezoelectric valve in longitudinal section as a normally open design, FIG. 9 showing a supply position and FIG. 10 showing a venting position.
Figure 10:
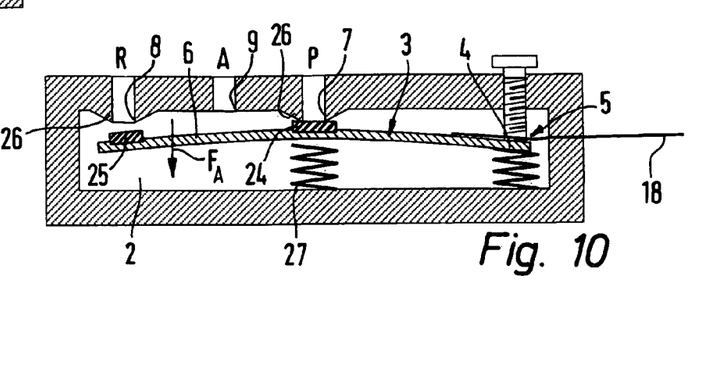
Figure 11:
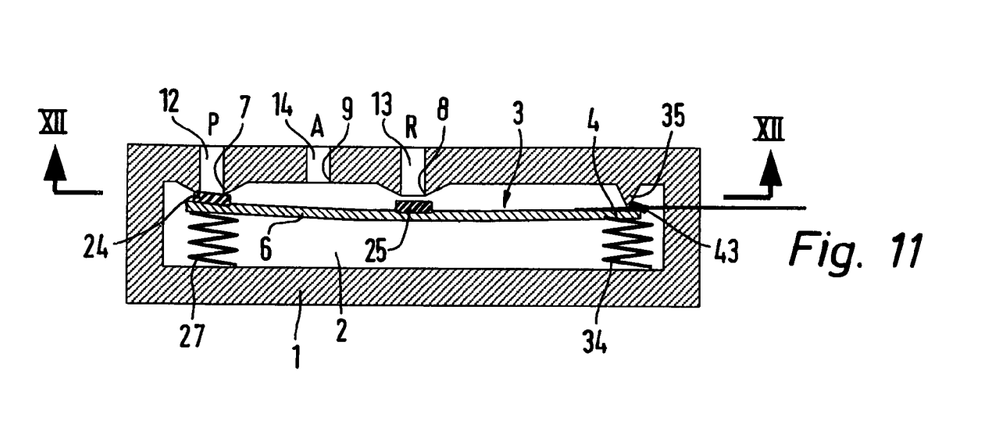
FIG. 11 shows a design differing from that of FIGS. 4 through 6 as regards the support on the housing of the flexural transducer and in the form of a 3/3 way piezoelectric valve in longitudinal section in the venting position, the supply opening and the exit flow opening being respectively in the form of two individual openings.

The piezoelectric valve illustrated in FIGS. 9 and 10 is of the "normally open" type, the supply position corresponding to the neutral condition. The slant of the flexural transducer 3 in relation to the valve seat plane 32 is in this case opposite to the neutral position of FIG. 7 so that the exit flow control section 25 is on the exit flow opening 8, whereas the supply side control section 24 is lifted clear of the supply opening 7.

In order in this case to produce the venting position the flexural transducer is so controlled that the operational section is impinged by a deflecting force $F_A$ directed away from the side of the valve seats 26, something which leads to the position depicted in FIG. 10, which is comparable with that of FIG. 3.

If the support position 5 is able to be adjusted in the deflection plane, as is the case with the piezoelectric valves of FIGS. 1 through 3 and 7 through 10, (adjustment movement 33) the desired valve functionality (or the desired valve type) may be selected simply by adjustment in level of the support position 5. In accordance with the selected setting in the neutral condition of the flexural transducer 3 there is a different relative position in relation to the valve seat plane 32—either essentially parallel to or slanted in one or the other direction—so that on the basis of a standard valve an extremely adaptable valve production program is possible using the same components.

It would be possible in principle to secure the flexural transducer 3 on its supporting section 4 in relation to the valve housing 1 in an immovable manner, for example by permanent clamping or embedding in a non-deforming cast material. However, the desired deformation of the flexural transducer 3 during switching operations are favored if the flexural transducer 3 is pivotally mounted at the support position 5 generally with reference to the valve housing 1, that is to say including the supporting section 4. This applies to all working examples.

The type of pivotal support illustrated in the working examples of FIGS. 1 through 3 and 7 through 20 has proved to be more particularly advantageous in this respect. In this case the supporting section 4 is braced in position with a certain degree of resilience between spring means 34 bearing against the valve housing 1 and a counter abutment on the valve housing. The resiliently elastic bracing effect means that the supporting section 4 may be pivoted in relation to the stationary counter abutment 35, there being in accordance with the current deflection a greater or less compression of the spring means 34, which compensates for the pivot angle.

In the case of the working examples of FIG. 1 through 3 and 7 through 10 this type of support is combined in an advantageous manner with the above mentioned possibility of adjustment in level for the support position 5. This takes place since the counter abutment 35 is arranged on a setting member 36 able to be positioned in a variable manner in relation to the valve housing 1 in the direction of the desired adjustment movement 33, such member 36 being for example a screw. By adjustment of the setting member 36 the position of the counter abutment 35 is moved in the deflection direction 23, the supporting section 4 being entrained and remaining reliably in any set position owing to the spring means 34 acting on it. Dependent on the positioning of the setting member 36 only the degree of compression of the spring means 34 is changed, something which remains without effect of the quality of the pivotal bearing effect.

On the other hand in the case of the working examples of FIG. 11 through 20 the counter abutment 35 is arranged stationarily on the valve housing 1. This entails simpler and cheaper production.

In the working embodiment illustrated in FIGS. 4 through 6 the flexural transducer 3 is mounted in a pivotal manner on the support position at a stationary virtual axle (or axis) which is at a right angle to the deflection plane 37. Such axis means 37 are directly in the form of an axle, i.e. not merely virtual, for example as an arbor projecting through the two longitudinal edges of the flexural transducer 3 or a shaft extending through the flexural transducer 3 with both ends projecting, the projecting sections being respectively supported on the valve housing in a manner to ensure the desired degree of freedom of rotation.

In all cases it is expedient to so support the flexural transducer 3 within the valve housing 1 in the possible switching position in relation to the valve housing 1 that as regards its longitudinal axis 38 it has a statically defined multi-point support and more particularly a three-point supporting effect. This ensures a reliable peripherally complete engagement of the control sections 24 and 25 on the associated valve seat 26 when the respective closed position is assumed.

In the working embodiment illustrated in FIGS. 17 through 20 this is achieved in conjunction with controlled valve openings 7 and 8, which respectively comprise a single opening, by a counter abutment 35, which defines a linear counter abutment section 42, which is perpendicular to the deflection plane 22. In order to obtain such a linear counter abutment section 42 the counter abutment 35 may be designed like a stool with a sharp edge.

Figure 17:
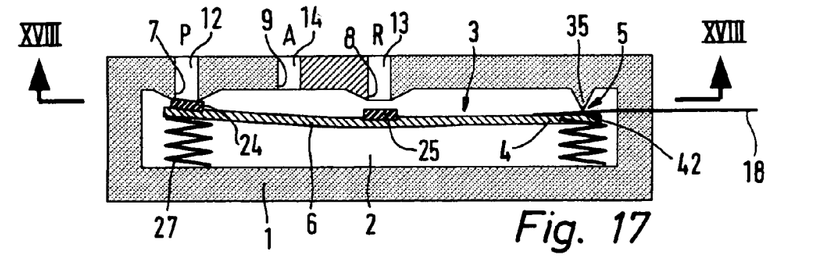
FIG. 17 shows a 3/3 way piezoelectric valve modified as regards the support function indicated in FIGS. 11 through 16, there being instead of a punctuate support means a linear support means, the valve being in the venting position.
Figure 18:
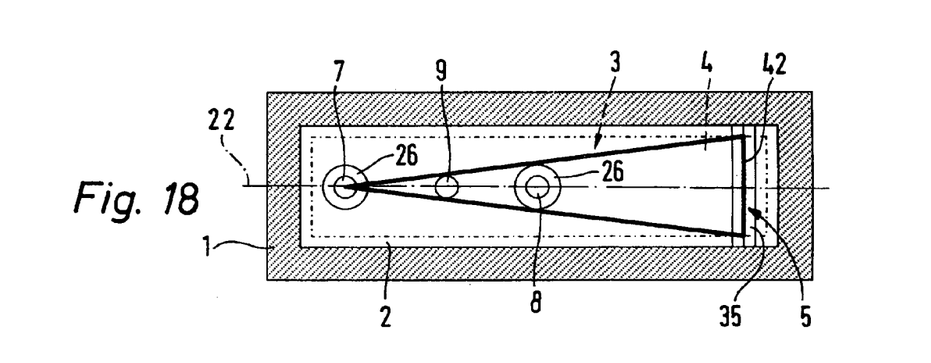
FIG. 18 shows the piezoelectric valve as in FIG. 17 sectioned on the line XVIII-XVIII, a triangle indicating the resulting supporting means for the flexural transducer.
Figure 19:
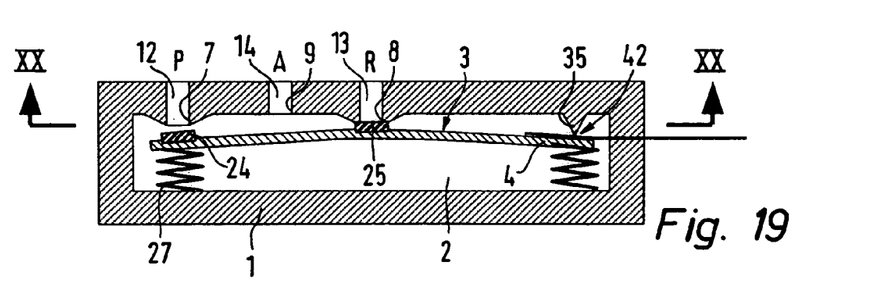
FIG. 19 shows the piezoelectric valve of FIG. 17 in a supply position.
Figure 20:
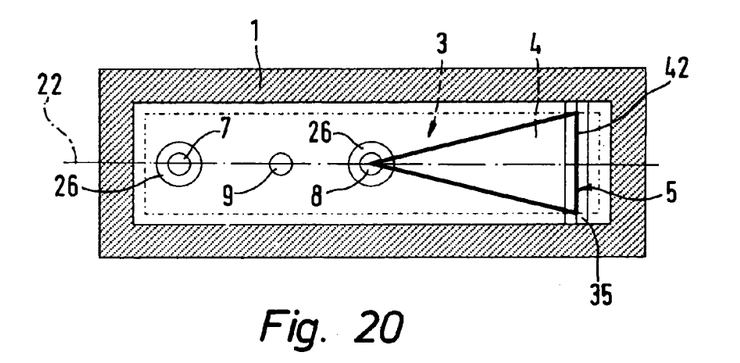
FIG. 20 shows of FIG. 19 in a section taken on the line XX-XX, the supporting means for the flexural transducer again being indicated by a triangular line.

In both the supply position in accordance with FIGS. 19 and 20 and also in the venting position in accordance with FIGS. 17 and 18 the flexural transducer 3 has on the one hand one of its control sections in point contact with one of the valve seats 26 while on the other hand it is supported linearly on the counter abutment 35. As a result there is the support configuration indicated in FIGS. 18 and 29 by a triangle, the corners of the triangle lying respectively at that control section, which is supported at a valve seat 26.

A comparable statically defined three point support effect for the flexural transducer 3 may however be produced in conjunction with a counter abutment 35, which in accordance with FIGS. 11 through 16 defines a punctuate counter abutment section 43, on which the supporting section 4 of the flexural transducer 3 is supported. In this case in order to produce the triangular support configuration the two control sections 24 and 25 are supported in the closed position perpendicularly to the deflection plane 22 along a major length on one or more spaced point in relation to the valve housing 1.

Figure 13:
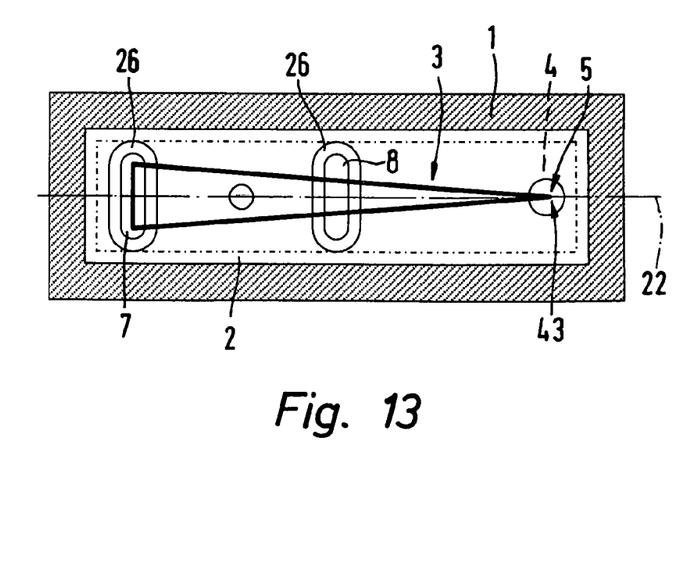
FIG. 13 shows a modification of the piezoelectric valve of FIG. 11 as regards the supply and exit flow openings in a cross sectional view corresponding to FIG. 12.
Figure 16:
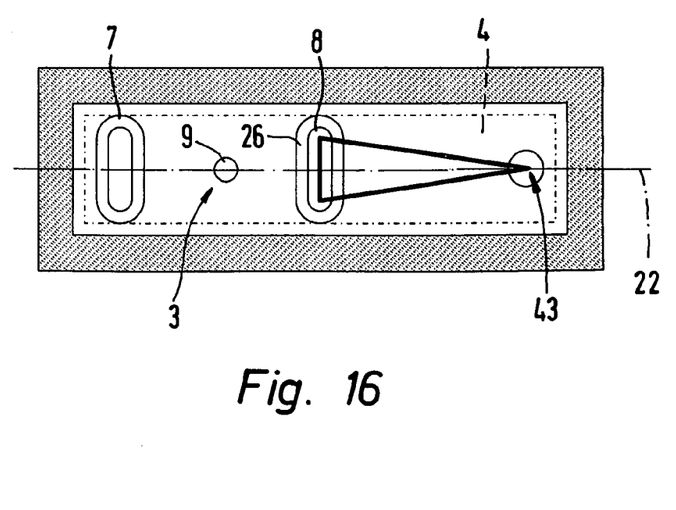
FIG. 16 shows a piezoelectric valve modified on the lines of FIG. 13 in a similar sectional representation, the support of the flexural transducer in a supply position being indicated.

This may be achieved for example in accordance with the design of FIGS. 13 and 16 because the valve opening 7 and 8 respectively to be controlled possesses an opening cross section, which in a direction perpendicular to the deflection plane possesses an elongated shape so that the valve seat 26 surrounding the respective valve opening 7 and 8 has a corresponding elongated form.

Figure 12:
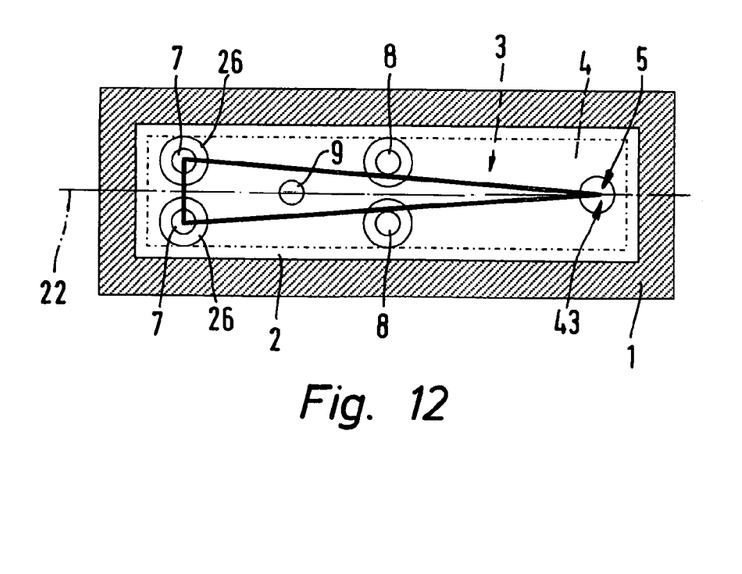
FIG. 12 shows a section taken through the piezoelectric valve of FIG. 11 on the section line XII-XII, a triangle having been inserted to show the support points for the flexural transducer.
Figure 15:
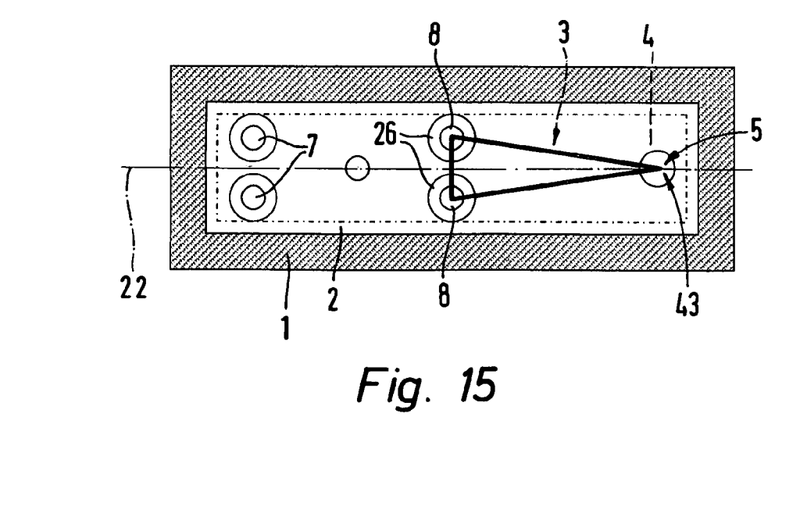
FIG. 15 shows piezoelectric valve of FIG. 14 in a section on the line XV-XV.

As an alternative with the designs in accordance with FIGS. 12 and 15 as well the respective controlled valve opening 7 and 8 could comprise not just one single opening but several thereof and more especially two single openings arranged perpendicularly to the deflection plane alongside one another. In this case each individual opening has its own valve seat 26, the transversely spaced out arrangement of the valve seats 26 in relation to the deflection circle 22 again leading to a a supporting action for the flexural transducer 3, which prevents same being tipped or twisted about the longitudinal axis.

Both working embodiments have the further advantage that they may be employed to produce larger opening cross sections without the dimensions of the openings having to be increased in the longitudinal direction of the flexural transducer 3.

The invention claimed is:

1. A piezoelectric valve comprising a flexural transducer arranged in a valve housing and having at one end a supporting section mounted by bearing means in the housing and furthermore possessing a free ending operational section, which extends in a valve chamber past two controlled valve openings in the form of a supply opening and an exit flow opening and is able to be deflected by suitable electrical control in a defection plane athwart its longitudinal direction in order to clear each of the two controlled valve openings selectively for connection with an operational opening or by engagement with an associated valve seat to close same, wherein the two controlled valve openings are arranged on the same longitudinal side of the operational section spaced apart in the longitudinal direction thereof, the operational section having two suitably spaced apart control sections on the supply side and the exit flow side, which are adapted to respectively seal the valve seats of the two controlled valve openings, and at the supply side control section actuating means provided in addition to the flexural transducer engage the operational section, such actuating means serving to continuously actuate the supply side control section in its closing direction, the actuating force being large enough to hold the supply side control section in the closed position when the exit flow control section is in the cleared position, and wherein the flexural transducer is so designed and arranged that in the electrically voltage-free neutral condition both control sections assume the closed position in relation to the controlled valve opening respectively associated with them, the flexural transducer being able to be so electrically controlled that its operational section starting with the neutral state experiences a deflecting force in the one or the other direction.

2. The piezoelectric valve as set forth in claim 1, wherein the supply opening is placed between the supporting section and the exit flow opening.

3. The piezoelectric valve as set forth in claim 1, wherein the exit flow opening is placed between the supporting section and the supply opening.

4. The piezoelectric valve as set forth in claim 1, wherein the flexural transducer in the neutral state has an at least approximately linear extent aligned parallel to a valve seat plane containing the valve seats of the two controlled valve openings.

5. The piezoelectric valve as set forth in claim 1, wherein the support position for the supporting section of the flexural transducer is able to be adjusted in the deflection plane athwart the longitudinal direction of the flexural transducer.

6. The piezoelectric valve as set forth in claim 1, wherein the actuating means are constituted by a spring means effective between the operational section and the valve housing.

7. The piezoelectric valve as set forth in claim 1, wherein the operational opening is arranged on the same longitudinal side as the controlled valve openings.

8. The piezoelectric valve as set forth in claim 1, wherein at least one of the two controlled valve openings has an opening cross section with an elongated configuration perpendicular to the deflection plane.

9. The piezoelectric valve as set forth in claim 1, wherein at least one of the two controlled valve openings is constituted by several individual openings arranged alongside each other perpendicularly to the plane of deflection.

10. The piezoelectric valve as set forth in claim 1, wherein the flexural transducer is so designed and arranged that in the electrically voltage-free neutral state the one control section assumes the closed position and the other control section assumes the released state.

11. The piezoelectric valve as set forth in claim 10, wherein in the neutral state the flexural transducer has an at least essentially linear extent, its longitudinal axis having a slant in relation to a valve seat plane containing the two controlled valve openings.

12. The piezoelectric valve as set forth in claim 11, wherein the support position for the supporting section of the flexural transducer is able to be adjusted in the deflection plane athwart the longitudinal direction of the flexural transducer and, by opposite adjustment of the support position, the slanting position present in the neutral state of the flexural transducer may be selectively so set that either the one or the other control section assumes the closed position and the respectively other control section assumes the cleared position.

13. The piezoelectric valve as set forth in claim 1, wherein the flexural transducer is mounted in a pivoting manner at the support position in relation to the valve housing.

14. The piezoelectric valve as set forth in claim 13, wherein the flexural transducer is pivotally mounted at the support position by way of stationary virtual or material axis means which are perpendicular to the deflection plane.

15. The piezoelectric valve as set forth in claim 13, wherein the supporting section is thrust at the support position by spring means bearing against the valve housing in a resilient manner against a counter abutment secured to the valve housing.

16. The piezoelectric valve as set forth in claim 15, wherein the counter abutment is able to be adjusted in relation to the valve housing.

17. The piezoelectric valve as set forth in claim 15, wherein the counter abutment defines a counter abutment section which is punctuate or is linear and perpendicular to the deflection plane, said supporting section of the flexural transducer resting against such counter abutment.

18. A piezoelectric valve comprising:
a valve housing defining an interior elongated valve chamber and having a support means, a supply valve seat defining a supply opening spaced from said support means in a first longitudinal direction and an exit valve seat defining an exit flow opening spaced from said support means in said first longitudinal direction, said supply opening and said exit flow opening communicating with said valve chamber; and
a flexural transducer movably disposed within said valve chamber, said flexural transducer having a support section mounted to said valve housing support means and a free ending operational section opposite said support section, said operational section including a supply control section adapted to seal said supply valve seat and an exit flow control section adapted to seal said exit valve seat, wherein said flexural transducer is deflectable upon application of an electrical current to selectively open and close said supply opening and said exit flow opening, and wherein the flexural transducer is so designed and arranged that in the electrically voltage-free neutral condition both control sections assume the closed position in which both of said supply opening and said exit flow opening are sealed.

19. A piezoelectric valve as defined in claim 18, wherein each of said supply control section and said exit flow control section comprises a pad disposed on said operational control section of said flexural transducer, said pads being adapted to respectively seal said supply valve seat and said exit valve seat.

20. A piezoelectric valve as defined in claim 18, further comprising an actuating means disposed within said housing valve chamber, said actuating means engaging said operational section of said flexural transducer to bias said supply control section against said supply valve seat.

* * * * *